United States Patent Office 3,597,240
Patented Aug. 3, 1971

3,597,240
ENHANCED DIPOLAR EFFECTS IN MICROWAVE PROCESSING
Thomas R. Foltz, Jr., Clarendon Hills, Ill., assignor to Armour and Company, Chicago, Ill.
No Drawing. Filed May 28, 1969, Ser. No. 828,708
Int. Cl. A23l 3/32
U.S. Cl. 99—221
9 Claims

ABSTRACT OF THE DISCLOSURE

A process for creating sterilization temperatures in particulate materials through the use of microwave heating. A lossy liquid is added to the material before subjecting it to microwave heating, whereby the resultant change in the loss characteristics of the particulate material allows the production of sterilization temperatures with the application of microwave energy.

---

There frequently exists in the food processing industry a requirement for sterilizing various essentially granular vegetable materials such as berries used in spices, grains, beans and the like. Such sterilization as may be required for these products is customarily carried out by heating the materials, such as by conventional methods of convective or conductive heating.

Different substances will demonstrate very different reactions or results when subjected to microwave energy. This phenomena may be a function of the particular molecular structure of the substance involved. Some substances are virtually transparent to microwave energy, and microwave energy can be repeatedly passed through the substances with little or no heating effect observed. On the other hand, some substances are capable of absorbing microwave energy at a high level, and a significant increase in temperature in these substances is observed upon their exposure to microwave energy.

As has been previously indicated, the specific point in the spectrum of reactions to microwave energy at which a particular substance will fall may be dependent upon the molecular structure of that substance and the concomitant degree of agitation of the molecules induced by microwave energy. These tendencies are generally referred to as the dielectric loss characteristics of the material; a "low loss" material generally not being significantly affected by microwave energy and demonstrating a low order of heating as a result of the application of energy at microwave frequencies, and a "lossy" material generally being one of good microwave absorption characteristics and displaying significant heating upon exposure to microwave energy.

The application of microwave energy to particulate substances, such as berries, grains and the like, indicates that their natural dielectric loss characteristics are not favorable to the production of the degree of heating necessary in sterilization, and the use of the substances as a "load" for microwave energy results in an inefficient process. I have discovered a process wherein a coating of lossy liquid is applied to the granular substance to alter its dielectric loss characteristics and permit the production of high temperatures within the granular material through the application of microwave energy.

Accordingly it is an object of the present invention to provide a process for the sterilization heating of granular substances through the use of microwave energy.

It is a further object of the present process to provide a means for altering the dielectric loss characteristics of granular substances to increase their responsiveness to microwave energy.

A still further object of the present process is to provide a method for sterilizing granular products which is simple, economical and efficient.

The method of my present invention can be more readily understood through a description of certain preferred embodiments thereof.

Dry, granular substances in general do not have dielectric loss characteristics which are favorable to efficient heating by energy of microwave frequency. For instance, when berries of *Piper nigrum* (black pepper) were subjected to microwave frequency energy for a period of about three (3) minutes, an increase in temperature of about 40° C. was produced. Such a temperature differential was not sufficient to raise the berries to an ultimate temperature considered satisfactory for sterilization.

II wound that when similar black pepper berries are mixed with a lossy liquid in an amount sufficient to "wet" or coat the berries with a film of the lossy material, and the coated berries are then subjected to identical conditions of microwave energy for the same period of time, a temperature increase in excess of 100° C. was produced.

While this result in itself is surprising and unexpected, it is perhaps even more significant to point out that when water was employed as the lossy liquid, the final temperature of the black pepper berries treated in accordance with the present invention was significantly above the boiling point of water at standard barometric pressure. This indicates that the heating effect in the berries themselves is far in excess of that which could be attributed merely to the absorption and heating by the lossy liquid alone.

It can be seen that the addition of a coating of liquid material to the particulate matter produces an effect opposite from that normally observed in the microwave treatment of moisture-bearing substances. For example, when potato slices containing substantial moisture are subjected to microwave energy, they are initially a relatively lossy substance capable of absorbing substantial amounts of microwave energy, resulting in significant heat generation within the slices. But as the microwave energy is applied further, the water is driven off leaving potato slices which are drier and much less lossy. With this decrease in dielectric loss characteristics of the slices, less microwave energy is coupled into the slices with a corresponding reduction in heating and a substantial decrease in efficiency. In the present process, the heating of the material continued to a temperature far beyond that required to drive off the liquid coating.

By reference to a lossy liquid, I intend to indicate a liquid having a higher dielectric loss characteristic than the particulate material to which it is added, and in which the particulate material is insoluble. While the lossy liquid used to coat the granular substance may be varied by those skilled in the art, I prefer to use water for this purpose because it is economical and simple, and at the same time highly effective. However other materials which have relatively high dielectric loss characteristics and are capable of coating the granular substance may also be used without departing from the scope of the invention.

The lossy liquid employed in the practice of the present invention is added to coat the granular material to be heated with microwave energy. It will be understood that the invention includes adding the liquid in various ways, including adding the liquid to the particulate material or adding the material to the liquid. I prefer to spread the liquid over the surfaces of the granular material, but other methods that will serve to coat the granular material may also be used.

By microwave energy I mean electrical energy of a frequency of about 200 to 10,000 megacycles per second. The invention is not limited to any particular frequency within the microwave range, and satisfactory results have been obtained using the commonly utilized microwave frequencies of 915 mHz. and 2450 mHz.

While the invention has been specifically illustrated with relation to black pepper berries, it will be understood that its application extends to other particulate materials, such as other spice berries, grains, powders and the like.

The lossy liquid is added to the granular substance in an amount sufficient to wet or coat the surface of the grains in a substantially uniform fashion. While the amount of lossy material to be added will vary somewhat with the particular granular substance to be treated and the particular lossy material used, I prefer to add the lossy material in an amount of about 10–20% by weight of the granular substance. However, amounts less than 10% or greater than 20% can be used with satisfactory results. When water is used as the lossy liquid, I prefer to add in an amount of about 15% by weight, the water being spread uniformly over the surface of the berries prior to subjecting the berries to microwave energy.

The intensity and duration of application of the microwave energy may vary widely depending upon the material to be heated and the final temperature desired. The present process is particularly well suited to the treatment of heat labile materials wherein the instability threshold of the material is both a function of temperature and time. Generally higher temperatures can be attained in a much shorter time with microwave heating than with other more conventional heating methods. With the addition of the lossy liquid in the manner disclosed herein, still higher temperatures can be achieved in a relatively short period. In many applications, such as the treatment of foodstuffs, medicinals, animal gland products and the like, it may be desirable to apply microwave energy until sterilization temperatures are reached.

The invention will be more specifically described by reference to the following examples, which are intended to be illustrative of the process and not by way of limitation.

EXAMPLE I

For purposes of illustrating the effects of the present method, the following experiment was conducted without the addition of the lossy liquid as called for in the instant invention.

One hundred (100) grams of mature whole peppercorns at a temperature of 22° C. were placed into a microwave oven. The peppercorns were subjected to microwave energy at a frequency of 915 mHz. at a power level of 15 kw. for a period of three minutes. The peppercorns were removed from the oven and the exit temperature of the berries was measured and found to be 64° C. The resulting temperature increase of the berries as a result of the microwave heating was 42° C.

EXAMPLE II

To one hundred (100) grams of mature whole peppercorns, as in Example I, was added 15 grams of water, the water being uniformally spread over the surface of the peppercorns. The wetted berries were placed into a microwave oven and subjected to microwave energy at 915 mHz. at a power level of 15 kw. for three minutes. As in Example I, the original temperature of the peppercorns was 22° C. After the treatment with microwave energy for three minutes, the peppercorns were removed and the final temperature was measured. The final temperature of the peppercorns was 132° C., showing a temperature increase of 110° due to the microwave energy treatment.

While it will be understood that the present invention is not limited to any particular theory of operation, it is believed that the surprising results obtained through the present process result from an actual modification of the dielectric loss characteristics of the granular substance. It is believed that the additional microwave energy absorbed by the lossy film on the berries, and the resulting heating therefrom, causes a sufficient increase in the temperature of the berries themselves to alter their dielectric loss characteristics, enabling them to become vastly more responsive to microwave energy and capable of attaining temperatures far in excess of those temperatures which will cause the film of lossy material itself to be driven off.

While in the foregoing specification I have described the invention in detail for purposes of clarity and understanding, it will be understood further that the invention is not limited thereby and that many modifications and alterations thereof can be made by those skilled in the art without departing from the spirit or scope of the invention, which is defined in the appended claims.

I claim:

1. A process for treating dry particulate material having low dielectric loss characteristics comprising coating the surfaces of particles of said material with a lossy liquid, and subjecting said material to microwave energy to heat said material.

2. A process for heating an initially dry particulate material having low dielectric loss characteristics comprising the steps of adding a lossy liquid to said material to coat the surface of said material, and subjecting said material to microwave energy whereby said material is heated.

3. The process according to claim 2 wherein said lossy liquid is added in a proportion of about 10–20% by weight.

4. The process according to claim 2 wherein said lossy liquid is water.

5. The process according to claim 4 wherein said water is added in an amount of about 15% by weight.

6. The process according to claim 2 wherein said microwave energy is applied until the temperature of said material exceeds 100° C.

7. A process of treating an initially dry particulate material having low dielectric loss characteristics comprising the steps of adding water to said material in an amount of about 15% by weight, said water being added by spreading it over the surface of said initially dry material whereby the water forms a substantially uniform coating on the surfaces of said material, and subjecting said material to microwave energy to raise the temperature of said material above 100° C.

8. A process for treating an initially dry particulate food material having low dielectric loss characteristics comprising the steps of adding a lossy liquid to coat the surfaces of said initially dry material, and subjecting said material to microwave energy to heat said material to sterilization temperatures.

9. The process according to claim 8 wherein said food material is berries.

References Cited

UNITED STATES PATENTS

| | | | |
|---|---|---|---|
| 2,474,650 | 6/1949 | Birdseye | 99—221X |
| 3,437,495 | 4/1969 | Jeppson | 99—221X |

FOREIGN PATENTS

| | | | |
|---|---|---|---|
| 313,979 | 6/1929 | Great Britain | 99—221 |

TIM R. MILES, Primary Examiner